(12) United States Patent
You et al.

(10) Patent No.: US 9,258,251 B2
(45) Date of Patent: *Feb. 9, 2016

(54) RESOURCE AND ADMISSION CONTROL METHOD

(75) Inventors: Jianjie You, Guangdong Province (CN); Mo Sun, Guangdong Province (CN); Jun Song, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 709 days.

This patent is subject to a terminal disclaimer.

(21) Appl. No.: 13/257,649

(22) PCT Filed: Oct. 20, 2009

(86) PCT No.: PCT/CN2009/074535
§ 371 (c)(1),
(2), (4) Date: Nov. 25, 2011

(87) PCT Pub. No.: WO2010/145110
PCT Pub. Date: Dec. 23, 2010

(65) Prior Publication Data
US 2012/0158936 A1    Jun. 21, 2012

(30) Foreign Application Priority Data

Jun. 18, 2009  (CN) .......................... 2009 1 0150025

(51) Int. Cl.
G06F 15/173    (2006.01)
H04L 12/911    (2013.01)
H04L 12/24    (2006.01)

(52) U.S. Cl.
CPC .......... *H04L 47/782* (2013.01); *H04L 41/0896* (2013.01); *H04L 41/5045* (2013.01); *H04L 41/5054* (2013.01); *H04L 47/824* (2013.01)

(58) Field of Classification Search
CPC ................................ H04L 47/70; H04L 47/78
USPC .......................................................... 709/223
See application file for complete search history.

(56) References Cited

U.S. PATENT DOCUMENTS 6,578,076 B1 *    6/2003    Putzolu .......................... 709/223

OTHER PUBLICATIONS

"Resource and admission control functions in next generation networks", Chapter 9, Recommendation ITU-T Y.2111 dated Nov. 2008.*

(Continued)

*Primary Examiner* — David X Yi
(74) *Attorney, Agent, or Firm* — Ling Wu; Stephen Yang; Ling and Yang Intellectual Property

(57) ABSTRACT

The present invention provides a resource and admission control method applied to nomadicity and wholesale scenarios, which clarifies an interaction process between a PD-FE of a NGN home operator/NGN retail service provider and a PE-FE of a NGN home operator/NGN retail service provider, puts forward a resource request process, resource modification process and resource release process of the resource and admission control method applied to the nomadicity and wholesale scenarios, and solves problems existing in the related art.

7 Claims, 6 Drawing Sheets

(56) References Cited

OTHER PUBLICATIONS

Jongtae Song, Mi Young Chang, and Soon Seok Lee "Overview of ITU-T NGN QoS Control", IEEE Communications Magazine, Sep. 2007.*

"Overview of ITU-T NGN QoS Control"; Jongtae Song et al; Electronics and Telecommunications Research Institute (ETRI) Jinoo Joung, Sangmyung University; QoS Control in Next-Generation Multimedia Networks; XP11193739A; IEEE Communications Magazine, Sep. 2007; see pp. 116-123.

* cited by examiner

RESOURCE AND ADMISSION CONTROL METHOD

TECHNICAL FIELD

The present invention relates to the field of communication, and more particularly, to a resource and admission control method applied to nomadicity and wholesale scenarios.

TECHNICAL BACKGROUND

At present, the next generation network (NGN), which is one of hotspot research subjects in the current communication standard field, uses the Internet protocol (IP) packet technology as a bearer network technology and integrates with fixed communication and mobile communication so as to provide more abundant multimedia services, such as emerging services having real-time requirements (IP television, video conference, multimedia distance education, video on demand, etc.), which require that a communication network should be able to provide support for high efficient end-to-end Quality of Service (QoS). Meanwhile, users' requirements for network Quality of Service are higher and higher. Therefore, how to provide the end-to-end QoS will be one of core problems of the NGN.

The International Telecommunication Union-Telecommunication Standardization Sector (ITU-T), which is the telecommunication standardization sector of the International Telecommunication Union (ITU), has constituted a standard regarding to resource and admission control. In the latest resource and admission control function (RACF) draft published by the ITU-T, a function frame of the RACF is provided, as shown in FIG. 1. The RACF is comprised of two portions, a policy decision functional entity (PD-FE) and a transport resource control functional entity (TRC-FE). The TRC-FE interacts with a transport function through an Rc interface and interacts with a transport resource enforcement functional entity (TRE-FE) through an Rn interface; whereas the PD-FE interacts with the TRC-FE through an Rt interface, interacts with a customer premises network (CPN) through an Rh interface, interacts with a policy enforcement functional entity (PE-FE) through an Rw interface, interacts with a service control function (SCF) in a service layer through an Rs interface, interacts with a network attachment control function (NACF) through an Ru interface, and interacts with other next generation networks through an Ri interface.

In addition, the PD-FE is independent of both the transport technology and the SCF, and makes a final decision of resource and admission control based on network policy rules, service information provided by the SCF, transport layer subscription information provided by the NACF and resource availability decision results provided by the TRC-FE.

The TRC-FE is independent of services, but is associated with the transport technology. The TRC-FE is responsible for collecting and maintaining transport network information and resource state information. After receiving a resource request from the PD-FE, the TRC-FE performs resource-based admission and control based on the QoS, priority requirements, resource availability information and transport-related policy rules.

The transport layer is comprised of a policy enforcement functional entity (PE-FE) and a transport resource enforcement functional entity (TRE-FE). The PE-FE performs policy rules sent down by the PD-FE. The PE-FE, which is a packet to packet gateway, may be located between a customer premises network (CPN) and an access network, between an access network and a core network, or between different operator networks, and is a key node for supporting dynamic QoS control, port address translation control and network address translation (NAT) traversal. The TRE-FE performs transport resource policy rules sent down by the TRC-FE, and their scope and functions and the Rn interface remain to be further studied and are not within the research scope of the R2 stage.

At present, in order to support application of nomadicity, a diagram of a RACF nomadicity scenario is given, as shown in FIG. 2. In FIG. 2, a SCF belongs to a NGN home operator and interacts with a PD-FE of the NGN home operator. The PD-FE of the NGN home operator interacts with a PD-FE of a NGN visit operator through an Ri interface; PD-FE interacts with PE-FE and TRC-FE in its network through an Rw interface and an Rt interface, respectively.

In order to support application of wholesale, a diagram of a RACF wholesale scenario is given, as shown in FIG. 3. In FIG. 3, a SCF belongs to a NGN retail service provider that is generally an actual service provider. A PD-FE of the NGN retail service provider interacts with a PD-FE of the NGN wholesale service provider that is generally a network operator through an Ri interface. In the wholesale scenario, the network operator uses a network level as infrastructure for opening to multiple service providers in a wholesale way and does not provide services; whereas the service provider provides various services. When users are in this scenario, they access networks via a network of the network operator to visit the networks and enjoy the services provided by the service providers.

It can be seen from the two scenarios described above that RACF network configurations of nomadicity and wholesale are same and corresponding resource and admission control methods are consistent as well. Hereinafter, PD-FEs of the NGN home operator and the NGN retail service provider will be denoted by PD-FE(H); PE-FEs of the NGN home operator and the NGN retail service provider will be denoted by PE-FE(H); PD-FEs of the NGN visit operator and the NGN wholesale service provider will be denoted by PD-FE(V); PE-FEs of the NGN visit operator and the NGN wholesale service provider will be denoted by PE-FE(V); and TRC-FEs of the NGN visit operator and the NGN wholesale service provider will be denoted by TRC-FE(V).

In the existing nomadicity/wholesale scenario, the interaction between the PD-FE(H) and PR-FE(H) is not considered. FIG. 4 is a flow chart of resource request in the related art, which comprises the following steps:

401, A user initiates a service request and sends a request message to a SCF to trigger the SCF to generate a resource initialization request.

402, The SCF determines QoS requirement parameters (e.g., bandwidth, service type, etc.) of the services to be requested and then sends the resource initialization request message (reservation) containing media stream description and the QoS parameters to a PD-FE(H) to request the RACF to authorize and reserve QoS resources.

403, The PD-FE(H) inspects for authorization the resource initialization request, including verifying whether the requested QoS resources are consistent with local operator policy rules and user subscription information from the NACF; if the check for authorization is passed, the PD-FE(H) makes initial policy decision for the service request based on the user subscription information, the local operator policy rules and service information.

404, Since the PD-FE(H) does not have transport layer resources requested, the resource initialization request message is further sent to PD-FE(V).

405, The PD-FE(V) inspects for authorization the resource initialization request, including verifying whether the requested QoS resources are consistent with the local operator policy rules.

406, The PD-FE(V) decides (i.e., selects) an access network and a core network which the requested QoS resources are involved with and then sends the resource initialization request message (availability check) to a corresponding TRC-FE(V) based on the decision result to inspect resource availability of the involved network.

407, The PD-FE(V) makes final admission decision based on the authorization check result in step 405 and the check result of the resource availability in step 406; if the requested QoS resources are rejected, the PD-FE(V) sends a resource initialization response message containing the reason for rejection to the PD-FE(H).

408, If the final decision policy is required to be installed in the PE-FE, the PD-FE(V) sends the resource initialization request message to the PE-FE(V) to install the final decision policy.

409, The PE-FE(V) installs the final decision policy from the PD-FE(V) and sends the resource initialization response to the PD-FE(V).

The step 408 and 409 are optional.

410, The PD-FE(V) sends the resource initialization response to the PD-FE(H).

411, The PD-FE(H) sends the resource initialization response to the SCF.

It can be seen from the above that there is no interaction between the PD-FE(H) and PR-FE(H) in the existing nomadicity/wholesale scenario. Since it is equivalent to being located between the access network and the core network for the PE-FE(H) in this scenario, it implements a core boundary gateway function and has functions, such as NAT traversal, port address translation control, gating, QoS marking and resource synchronization, all of which are required to be completed under the control of the PD-FE(H). If there is no interaction between the PD-FE(H) and PE-FE(H), the corresponding functions of PE-FE(H) cannot be implemented such that service requests from users can not be satisfied.

Content of the Invention

A technical problem to be solved by the present invention is to overcome shortcomings of the prior art and provide a resource and admission control method so as to solve the problem that there lacks interaction between a PD-FE(H) and a PE-FE(H) in a nomadicity/wholesale scenario in the related art.

In order to solve the problems described above, the present invention provides a resource and admission control method comprising:

after receiving a resource initialization request for requesting Quality of Service (QoS) resources for services, sent by a service control function (SCF), a policy decision functional entity (PD-FE) of a home operator or retail service provider making an initial policy decision for this request to generate a decision policy; and the PD-FE of the home operator or retail service provider deciding whether the decision policy is required to be installed in a policy enforcement functional entity (PE-FE) of the home operator or retail service provider for the resource initialization request, and sending the resource initialization request to the PE-FE of the home operator or retail service provider to install the decision policy if yes.

Furthermore, the method further comprises:

the PE-FE of the home operator or retail service provider returning a resource initialization response to the PD-FE of the home operator or retail service provider after installing the decision policy.

Furthermore, the PD-FE of the home operator or retail service provider makes the initial policy decision based on user subscription information, local operator policy rules and service information.

Furthermore, after the PD-FE of the home operator or retail service provider making the initial policy decision, the method further comprises:

the PD-FE of the home operator or retail service provider sending the resource initialization request for requesting the QoS resources for the services to a PD-FE of a visit operator or wholesale service provider; and the PD-FE of the home operator or retail service provider receiving a resource initialization response returned by the PD-FE of the visit operator or wholesale service provider and sending the resource initialization request to the PE-FE of the home operator or retail service provider.

The present invention also provides a resource and admission control method comprising:

after receiving a resource modification request for modifying Quality of Service (QoS) resources for services, sent by a service control function (SCF), a policy decision functional entity (PD-FE) of a home operator or retail service provider making an initial policy decision for this request to generate a decision policy; and the PD-FE of the home operator or retail service provider deciding whether the decision policy is required to be installed in a policy enforcement functional entity (PE-FE) of the home operator or retail service provider for the resource modification request, and sending the resource modification request to the PE-FE of the home operator or retail service provider to install the decision policy if yes.

Furthermore, the method further comprises:

the PE-FE of the home operator or retail service provider returning a resource modification response to the PD-FE of the home operator or retail service provider after installing the decision policy.

Furthermore, the PD-FE of the home operator or retail service provider makes the initial policy decision based on user subscription information, local operator policy rules and service information.

Furthermore, after the PD-FE of the home operator or retail service provider making the initial policy decision, the method further comprises:

the PD-FE of the home operator or retail service provider sending the resource modification request for modifying the QoS resources for the services to a PD-FE of a visit location operator or wholesale service provider; and the PD-FE of the home operator or retail service provider receiving a resource modification response returned by the PD-FE of the visit operator or wholesale service provider and sending the resource modification request to the PE-FE of the home operator or retail service provider.

The present invention also provides a resource and admission control method comprising:

after receiving a resource release request for releasing Quality of Service (QoS) resources of services, sent by a service control function (SCF), a policy decision functional entity (PD-FE) of a home operator or retail service provider determining whether a policy enforcement functional entity (PE-FE) of the home operator or retail service provider has loaded a policy for the services, and sending the resource release request to the PE-FE of the home operator or retail service provider to unload the policy installed therein if the policy has been loaded.

Furthermore, the method further comprises:

after unloading the policy, the PE-FE of the home operator or retail service provider returning a resource releasing response to the PD-FE of the home operator or retail service provider.

The present invention provides a resource and admission control method applied to nomadicity and wholesale scenarios, which clarifies an interaction process between a PD-FE of a NGN home operator/NGN retail service provider and a PE-FE of a NGN home operator/NGN retail service provider, puts forward a resource request process, resource modification process and resource release process of the resource and admission control method applied to the nomadicity and wholesale scenarios, and solves problems existing in the related art.

PREFERRED EMBODIMENTS OF THE INVENTION

The present invention provides a resource and admission control method applied to nomadicity and wholesale scenarios which clarifies an interaction process between a PD-FE of a NGN home operator/NGN retail service provider (denoted by PD-FE(H)) and a PE-FE of a NGN home operator/NGN retail service provider (denoted by PE-FE(H)). Specifically, the present invention puts forward separately a resource request process, resource modification process and resource release process of the resource and admission control method applied to the nomadicity and wholesale scenarios and solves problems existing in the related art.

The present invention will be described in detail in conjunction with the accompanying drawings and embodiments.

Figure 1:
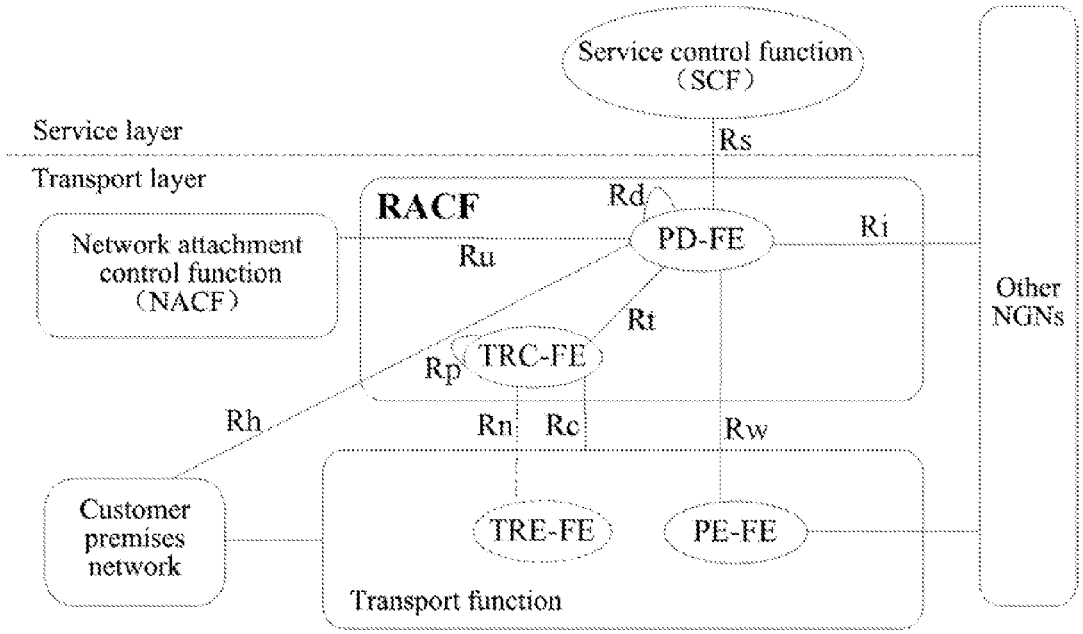
FIG. 1 is a schematic diagram of a function frame of RACF in the related art.
Figure 2:
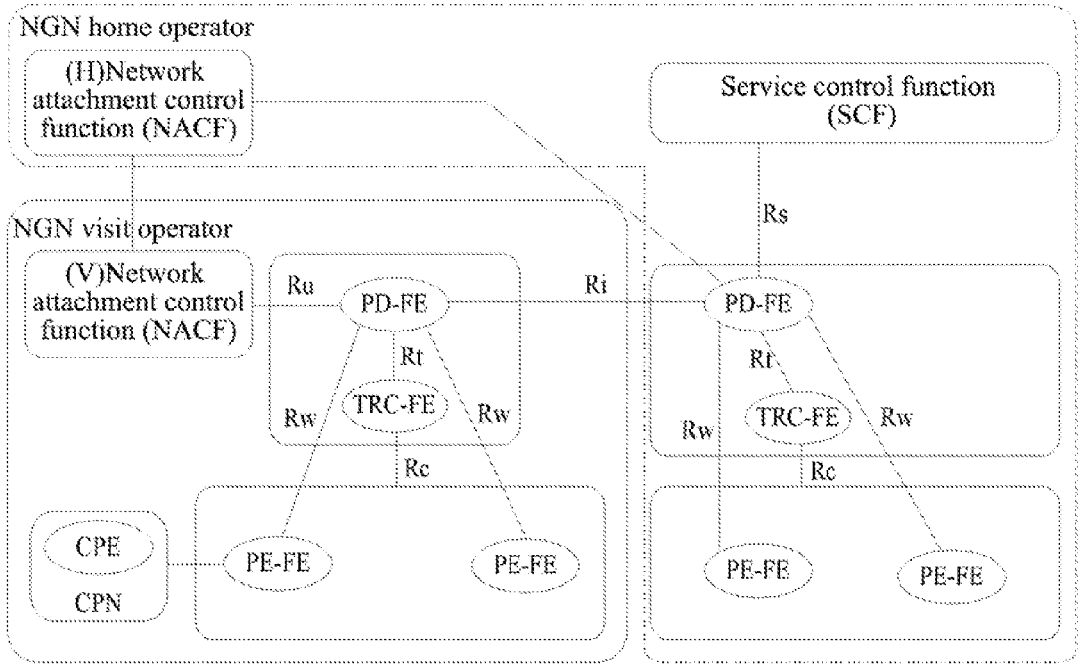
FIG. 2 is a diagram of a nomadicity scenario of a RACF in the related art.
Figure 3:
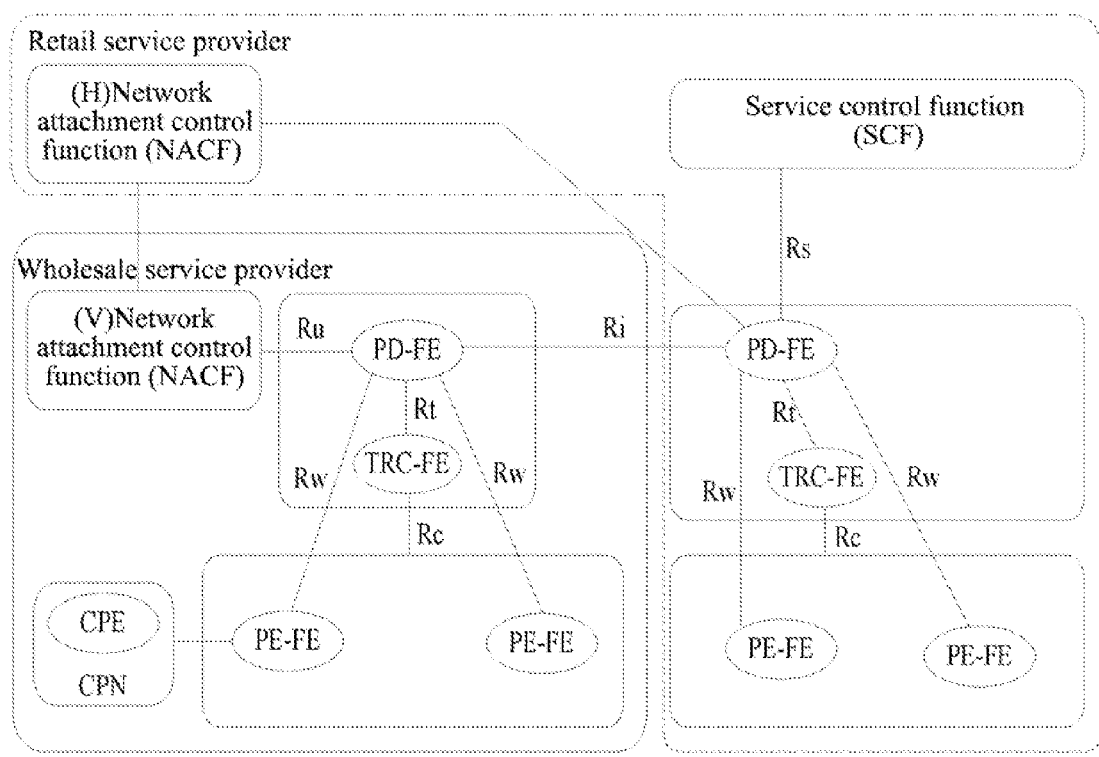
FIG. 3 is a diagram of a wholesale scenario of a RACF in the related art.
Figure 4:
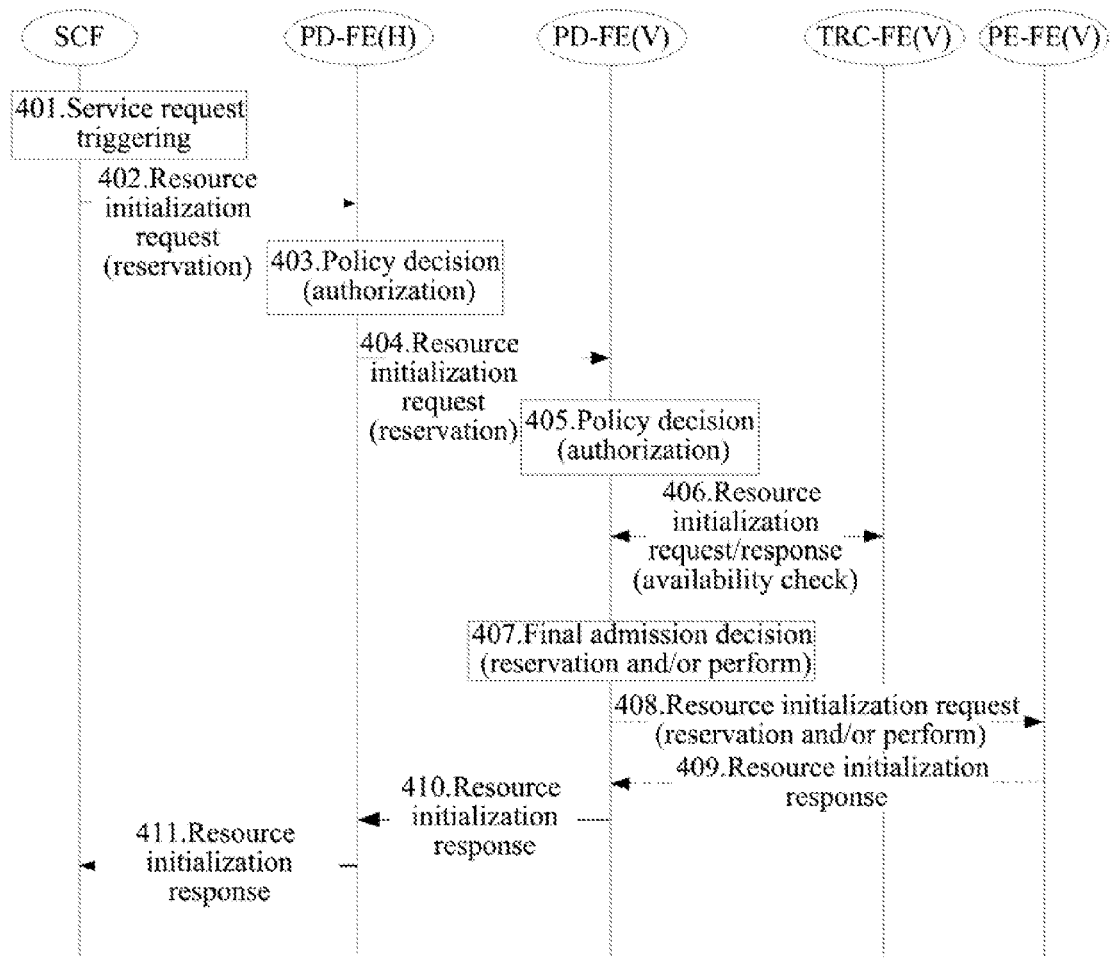
FIG. 4 is a flow chart of resource request in the related art.
Figure 5:
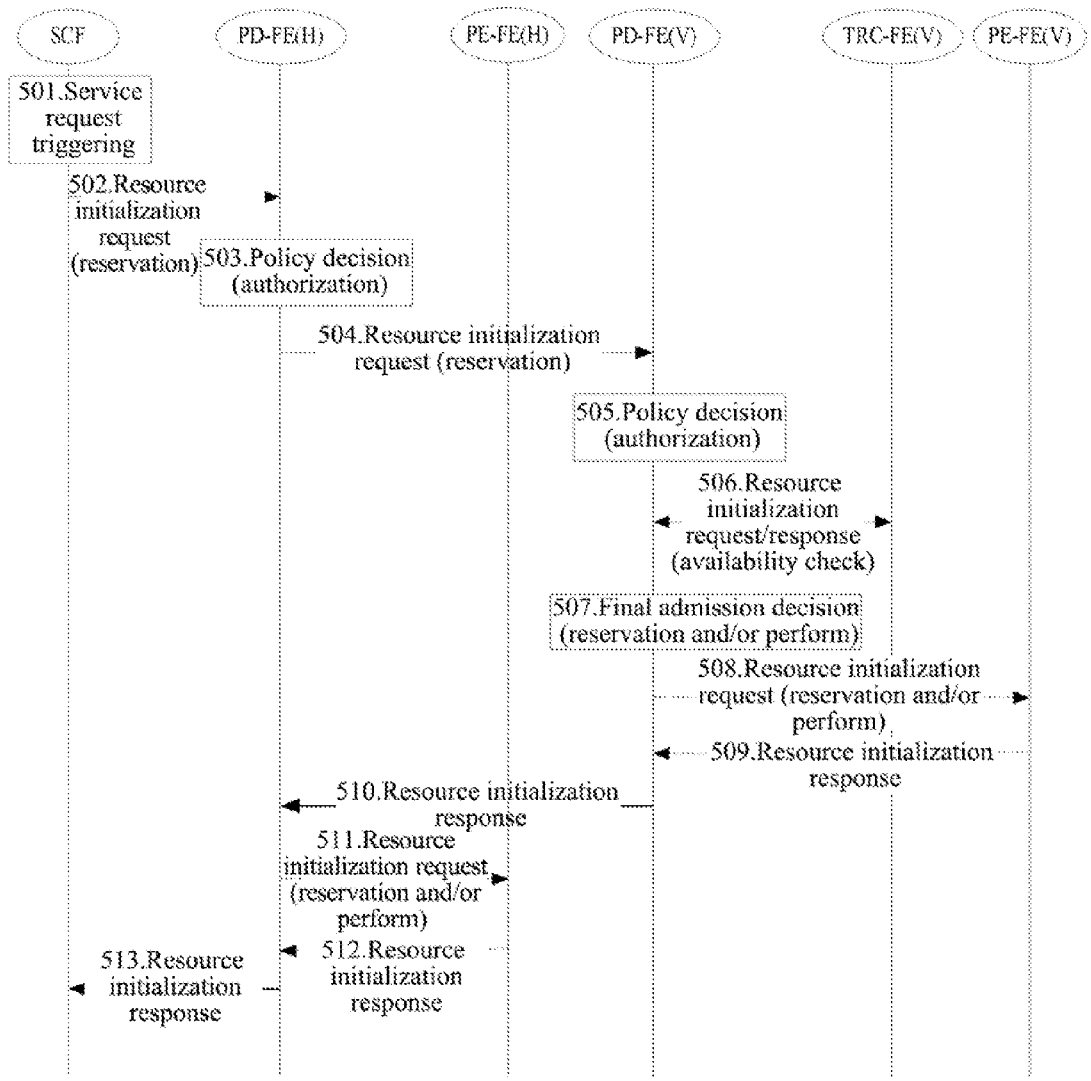
FIG. 5 is a flow chart of a resource request process in a resource and admission control method in accordance with an embodiment of the present invention.

FIG. 5 is a flow chart of a resource request process in a resource and admission control method in accordance with an embodiment of the present invention comprising the following steps.

501, A user initiates a service request and sends a request message to SCF to trigger the SCF to generate a resource initialization request.

502, The SCF determines QoS requirement parameters (e.g., bandwidth, service type, etc.) of the services to be requested and then sends the resource initialization request message (reservation) containing information such as media stream description and the QoS parameters to a PD-FE(H) to request RACF to authorize and reserve QoS resources.

503, The PD-FE(H) inspects for authorization the resource initialization request, including verifying whether the requested QoS resources are consistent with local operator policy rules and user subscription information from the NACF; if the check for authorization is passed (i.e., the requested QoS resources are consistent with the local operator policy rules and user subscription information), the PD-FE(H) makes initial policy decision for the service request based on the user subscription information, the local operator policy rules and service information.

504, Since the PD-FE(H) does not have the requested transport layer resources, the resource initialization request message is further sent to a PD-FE(V).

505, The PD-FE(V) inspects for authorization the resource initialization request, including verifying whether the requested QoS resources (QoS parameters) are consistent with the local operator policy rules.

506, The PD-FE(V) decides (i.e., selects) an access network and a core network which the requested QoS resources are involved with and then sends the resource initialization request message (availability check) to a corresponding TRC-FE(V) based on the decision result to inspect resource availability of the involved network.

507, The PD-FE(V) makes a final admission decision based on the authorization check result in step 505 and the check result of the resource availability in step 506; if the requested QoS resources are rejected, the PD-FE(V) sends a resource initialization response message containing the reason for rejection to the PD-FE(H), otherwise, the next step is performed.

508, If the final decision policy is required to be installed in the PE-FE(V), the PD-FE(V) sends the resource initialization request message to the PE-FE(V) to install the final decision policy.

509, The PE-FE(V) installs the final decision policy from the PD-FE(V) and sends the resource initialization response to the PD-FE(V).

The step 508 and 509 are optional.

510, The PD-FE(V) sends the resource initialization response to the PD-FE(H).

511, The PD-FE(H) decides whether the service request is required to send a request message to the PE-FE(H) (i.e., determines whether the initial decision policy generated in step 503 is required to be installed in the PE-FE(H) for the resource initialization request), and sends the resource initialization request message to the PE-FE(H) to install the corresponding decision policy if yes.

For example, if the result of the initial policy decision in step 503 is that services corresponding to the resource initialization request are required to implement functions, such as dynamic QoS control, port address translation control, network address translation traversal, the PD-FE(H) generates initial decision policies for the corresponding functions and instructs the PE-FE(H) to install the policies by sending the resource initialization request message in this step.

512, The PE-FE(H) installs the decision policy from the PD-FE(H) and sends a resource initialization response to the PD-FE(H).

513, the PD-FE(H) sends the resource initialization response to the SCF.

The resource initialization response contains result information that whether the QoS resource request is admitted.

Figure 6:
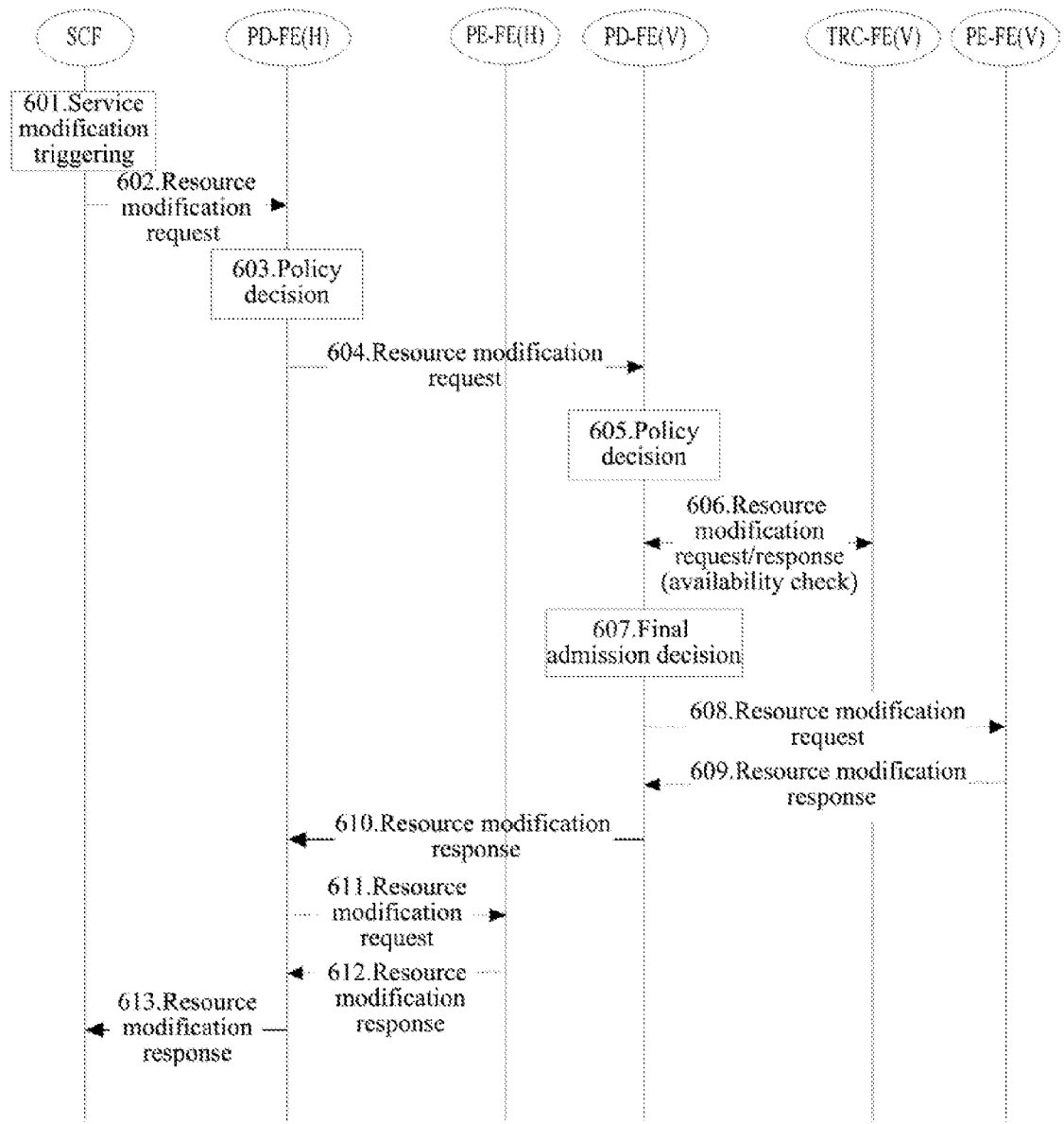
FIG. 6 is a flow chart of a resource modification process in a resource and admission control method in accordance with an embodiment of the present invention.

FIG. 6 is a flow chart of a resource modification process in a resource and admission control method in accordance with an embodiment of the present invention comprising the following steps.

601, A user initiates a service modification request and sends a modification request message to SCF to trigger the SCF to generate a resource modification request.

602, The SCF determines QoS parameters (e.g., bandwidth, service type, etc.) of the services to be modified and then sends the resource modification request message containing the QoS parameters to be modified to a PD-FE(H).

603, The PD-FE(H) inspects the modification request, including verifying whether the modified QoS resources are consistent with local operator policy rules and user subscription information from the NACF; if the check for authorization is passed, the PD-FE(H) makes initial policy decision for the resource modification request based on the user signing information, the local operator policy rules and service information to generate an initial decision policy.

604, Since the PD-FE(H) does not have the transport layer resources to be modified, the resource modification request message is further sent to a PD-FE(V).

605, The PD-FE(V) inspects for authorization the modification request, including verifying whether the modified QoS resources (QoS parameters) are consistent with the local operator policy rules.

606, The PD-FE(V) decides (i.e., selects) an access network and a core network which the QoS resources to be modified are involved with and then sends the resource modification request message (availability check) to a corresponding TRC-FE(V) based on the decision result to inspect resource availability of the involved network.

607, The PD-FE(V) makes a final admission decision based on the authorization check result in step 605 and the check result of the resource availability in step 606; if the QoS resources to be modified are rejected, the PD-FE(V) sends a resource modification response message containing the reason for rejection to the PD-FE(H), otherwise, the next step is performed.

608, If the final decision policy is required to be installed in the PE-FE (V), the PD-FE(V) sends the resource modification request message to the PE-FE(V) to install the final decision policy.

609, The PE-FE(V) installs the final decision policy from the PD-FE(V) and sends the resource modification response to the PD-FE(V).

The step 608 and 609 are optional.

610, the PD-FE(V) sends the resource modification response to the PD-FE(H).

611, The PD-FE(H) decides whether the service modification request is required to send a modification message to the PE-FE(H) (i.e., determines whether the initial decision policy generated in step 603 is required to be installed in the PE-FE (H) for the resource modification request, and sends the resource modification request message to the PE-FE(H) to install the corresponding decision policy if yes.

For example, if the result of the initial policy decision in step 603 is that services corresponding to the resource modification request are required to implement functions, such as dynamic QoS control, port address translation control, network address translation traversal, the PD-FE(H) generates initial decision policies for the corresponding functions and instructs the PE-FE(H) to install the policies by sending the resource initialization request message in this step.

612, The PE-FE(H) installs the decision policy from the PD-FE(H) and sends the resource modification response to the PD-FE(H).

613, the PD-FE(H) sends the resource modification response to the SCF.

The resource modification response contains result information that whether the QoS resource modification request is admitted.

Figure 7:
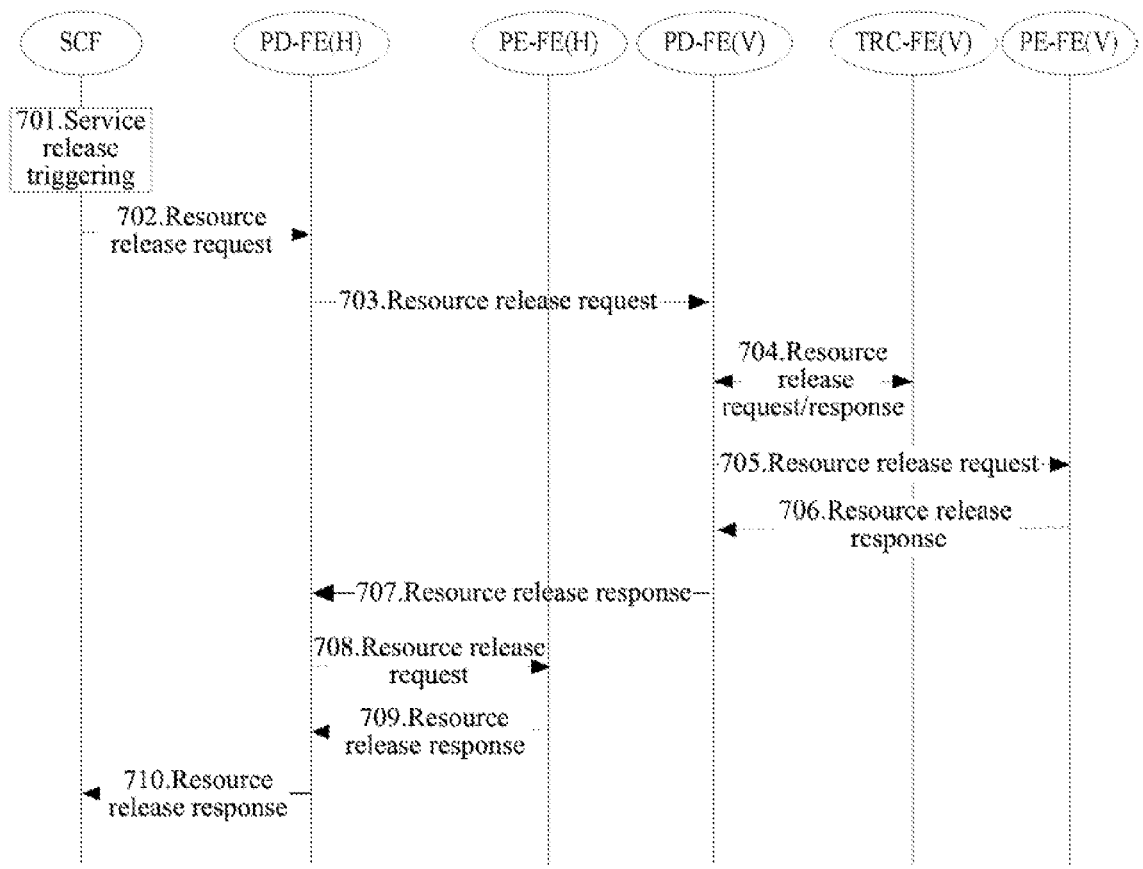
FIG. 7 is a flow chart of a resource release process in a resource and admission control method in accordance with an embodiment of the present invention.

FIG. 7 is a flow chart of a resource release process in a resource and admission control method in accordance with an embodiment of the present invention comprising the following steps.

701, A user initiates a service release request and sends a release request message to SCF to trigger the SCF to generate a resource release request.

702, The SCF sends the resource release request message containing information of QoS resources to be released to PD-FE(H).

703, Since the PD-FE(H) does not have the transport layer resources to be released, the resource release request message is further sent to a PD-FE(V).

704, The PD-FE(V) interacts with a TRC-FE(V) to release resources occupied by the TRC-FE(V).

Specifically, the interaction process comprises the PD-FE (V) sending the resource release request to the TRC-FE(V), which returns a resource release response to the PD-FE(V).

705, If the policy of the services has been installed in the PE-FE(V) (i.e., the step 508 and/or step 608 have been performed), the PD-FE(V) sends the resource release request message to the PE-FE(V) to unload the policy therein and release the QoS resources.

706, After the policy is unloaded, PE-FE(V) returns a resource release response to PD-FE(V);

The step 705 and 706 are optional.

707, The PD-FE(V) sends the resource release response to the PD-FE(H).

708, If the PE-FE(H) has loaded the policy for the corresponding services (i.e., the step 511 and/or step 611 have been performed), the PD-FE(H) sends the resource release request message to the PE-FE(H) to unload the policy therein and release the resources.

709, the PE-FE(H) returns the resource release response to the PD-FE(H).

The step 708 and 709 are optional.

710, the PD-FE(H) sends the resource release response to the SCF.

According to the basic principle of the present invention, various variations may be made to the embodiments described above, for example:

(1) In the resource request process of the embodiment described above, the step 511 is performed after the resource initialization response sent by the PD-FE(V) is received; while in other embodiments in accordance with the present invention, the step 511 may be performed after the step 503 and before the step 510.

(2) In the resource modification process of the embodiment described above, the step 611 is performed after the resource modification response sent by the PD-FE(V) is received; while in other embodiments in accordance with the present invention, the step 611 may be performed after the step 603 and before the step 610.

(3) In the resource release process of the embodiment described above, the step 708 is performed after the resource release response sent by the PD-FE(V) is received; while in other embodiments in accordance with the present invention, the step 708 may be performed after the step 703 and before the step 707.

INDUSTRIAL APPLICABILITY

The resource and admission control method applied to nomadicity and wholesale scenarios put forward by the present invention clarifies an interaction process between a PD-FE of a NGN home operator/NGN retail service provider and a PE-FE of a NGN home operator/NGN retail service provider, puts forward a resource request process, resource modification process and resource release process of the resource and admission control method applied to the nomadicity and wholesale scenarios, and solves problems existing in the related art.

What is claimed is:

1. A resource and admission control method comprising:
501) a service control function (SCF) generating a resource initialization request;
502) the SCF determining Quality of Service (QoS) requirement parameters of services to be requested by a user, and then sending the resource initialization request to a policy decision functional entity of a home operator or retail service provider (PD-FE(H));
503) after receiving the resource initialization request for requesting QoS resources for services, sent by the SCF, the PD-FE(H) making an initial policy decision for this resource initialization request to generate an initial decision policy;
504) the PD-FE(H) sending the resource initialization request to a PD-FE of a visit operator or wholesale service provider (PD-FE(V)) because the PD-FE(H) does not have requested transport layer resources;
505) the PD-FE(V) inspecting for authorization the resource initialization request, which includes verifying whether the requested QoS resources are consistent with local operator policy rules;
506) the PD-FE(V) deciding an access network and a core network which the requested QoS resources are involved with, and then sending the resource initialization request to a transport resource enforcement functional entity of the visit operator or wholesale service provider (TRC-FE(V)) based on a decision result to inspect resource availability of the involved network;
507) the PD-FE(V) making a final admission decision based on the authorization check result in step 505) and the check result of the resource availability in step 506) to generate a final decision policy, and then sending a resource initialization response to the PD-FE(H);
508) the PD-FE(V) sending the resource initialization request to a policy enforcement functional entity of the visit operator or wholesale service provider (PE-FE(V)) to install the final decision policy;
509) the PE-FE(V) installing the final decision policy from the PD-FE(V) and sending a resource initialization response to the PD-FE(V);
510) the PD-FE(V) sending the resource initialization response to the PD-FE(H);
511) after receiving the resource initialization response returned by the PD-FE(V), the PD-FE(H) deciding whether the initial decision policy is required to be installed in a PE-FE of the home operator or retail service provider (PE-FE(H)) for the resource initialization request, and then sending the resource initialization request to the PE-FE(H) to install the initial decision policy if yes;
512) the PE-FE(H) installing the initial decision policy from the PD-FE(H), and sending the resource initialization response to the PD-FE(H) after installing the initial decision policy; and
513) the PD-FE(H) sending the resource initialization response to the SCF;
wherein the steps 508 and 509 are optional.

2. The method according to claim 1, wherein: in the step 503),
the PD-FE(H) makes the initial policy decision based on user subscription information, local operator policy rules and service information.

3. A resource and admission control method comprising:
601) a service control function (SCF) generating a resource modification request;
602) the SCF determining Quality of Service (QoS) parameters of services to be modified by a user, and then sending the resource modification request to a policy decision functional entity of a home operator or retail service provider (PD-FE(H));
603) after receiving the resource modification request for modifying QoS resources for services, sent by the SCF, the PD-FE(H) making an initial policy decision for this resource modification request to generate an initial decision policy;
604) the PD-FE(H) sending the resource modification request to a PD-FE of a visit operator or wholesale service provider (PD-FE(V)) because the PD-FE(H) does not have requested transport layer resources to be modified;
605) the PD-FE(V) inspecting for authorization the resource modification request, which includes verifying whether the modified QoS resources are consistent with local operator policy rules;
606) the PD-FE(V) deciding an access network and a core network which the requested QoS resources to be modified are involved with, and then sending the resource modification request to a transport resource enforcement functional entity of the visit operator or wholesale service provider (TRC-FE(V)) based on a decision result to inspect resource availability of the involved network;
607) the PD-FE(V) making a final admission decision based on the authorization check result in step 605) and the check result of the resource availability in step 606) to generate a final decision policy, and then sending a resource modification response to the PD-FE(H);
608) the PD-FE(V) sending the resource modification request to a policy enforcement functional entity of the visit operator or wholesale service provider (PE-FE(V)) to install the final decision policy;
609) the PE-FE(V) installing the final decision policy from the PD-FE(V) and sending a resource modification response to the PD-FE(V);
610) the PD-FE(V) sending the resource modification response to the PD-FE(H);
611) after receiving the resource modification response returned by the PD-FE(V), the PD-FE(H) deciding whether the initial decision policy is required to be installed in a PE-FE of the home operator or retail service provider (PE-FE(H)) for the resource modification request, and sending the resource modification request to the PE-FE(H) to install the initial decision policy if yes;
612) the PE-FE(H) installing the initial decision policy from the PD-FE(H), and sending the resource modification response to the PD-FE(H) after installing the initial decision policy; and
613) the PD-FE(H) sending the resource modification response to the SCF;
wherein the steps 608 and 609 are optional.

4. The method according to claim 3, wherein: in the step 603),
   the PD-FE(H) makes the initial policy decision based on user subscription information, local operator policy rules and service information.

5. A resource and admission control method comprising:
   701) a service control function (SCF) generating a resource release request;
   702) the SCF sending the resource release request containing information of Quality of Service (QoS) resources to be released to a policy decision functional entity of a home operator or retail service provider (PD-FE(H));
   703) after receiving the resource release request for releasing the QoS resources of services, sent by the SCF, the PD-FE(H) sending the resource release request to a PD-FE of a visit operator or wholesale service provider (PD-FE(V)) because the PD-FE(H) does not have transport layer resources to be released;
   704) the PD-FE(V) interacting with a transport resource control functional entity of the visit operator or wholesale service provider (TRC-FE(V)) to release the resources occupied by the TRC-FE(V);
   705) if a final decision policy of the services has been installed in a policy enforcement functional entity of the visit operator or wholesale service provider (PE-FE(V)), the PD-FE(V) sending the resource release request to the PE-FE(V) to unload the final decision policy therein and release the QoS resources;
   706) after the final decision policy is unloaded, the PE-FE(V) returning a resource release response to the PD-FE(V);
   707) the PD-FE(V) sending a resource release response to the PD-FE(H); and
   708) after receiving the resource release response returned by the PD-FE(V), the PD-FE(H) determining whether a PE-FE of the home operator or retail service provider (PE-FE(H)) has installed an initial decision policy for the services, and sending the resource release request to the PE-FE(H) to unload the initial decision policy installed therein and release the resources if yes;
   709) the PE-FE(H) returning the resource release response to the PD-FE(H);
   710, the PD-FE(H) sending the resource release response to the SCF;
   wherein the steps 705 and 706 are optional.

6. The method according to claim 1, wherein the step 511) comprises:
   the PD-FE of the home operator or retail service provider judging whether services corresponding to the resource initialization request are required to implement dynamic QoS control, port address translation control, or network address translation traversal.

7. The method according to claim 3, wherein the step 611) comprises:
   the PD-FE of the home operator or retail service provider judging whether services corresponding to the resource modification request are required to implement dynamic QoS control, port address translation control, or network address translation traversal.

\* \* \* \* \*